(12) United States Patent
Geaghan et al.

(10) Patent No.: US 7,227,538 B2
(45) Date of Patent: Jun. 5, 2007

(54) TOUCH SENSOR WITH LINEARIZED RESPONSE

(75) Inventors: Bernard O. Geaghan, Salem, NH (US); Kenneth J. Keefer, Westford, MA (US); Bülent Bulat, Framingham, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 651 days.

(21) Appl. No.: 10/786,205

(22) Filed: Feb. 25, 2004

(65) Prior Publication Data

US 2005/0184965 A1   Aug. 25, 2005

(51) Int. Cl.
*G09G 5/00* (2006.01)

(52) U.S. Cl. ...................... 345/173; 345/156

(58) Field of Classification Search ............ 178/18.01, 178/18.02, 18.03, 18.04, 18.05; 345/156, 345/173, 177; 341/33; 707/535
See application file for complete search history.

(56) References Cited

U.S. PATENT DOCUMENTS

| | | | |
|---|---|---|---|
| 4,198,539 A | | 4/1980 | Pepper, Jr. |
| 4,293,734 A | | 10/1981 | Pepper, Jr. |
| 4,371,746 A | | 2/1983 | Pepper, Jr. |
| 4,797,514 A | | 1/1989 | Talmage, Jr. et al. |
| 4,822,957 A | * | 4/1989 | Talmage et al. ......... 178/18.05 |
| 5,045,644 A | | 9/1991 | Dunthorn |
| 5,220,136 A | * | 6/1993 | Kent ......................... 345/173 |
| 5,804,773 A | * | 9/1998 | Wilson et al. ........... 178/18.05 |
| 5,869,791 A | * | 2/1999 | Young ...................... 178/20.01 |
| 5,940,065 A | * | 8/1999 | Babb et al. ................. 345/178 |
| 6,163,313 A | * | 12/2000 | Aroyan et al. ............. 345/173 |
| 6,549,193 B1 | | 4/2003 | Huang et al. |
| 6,593,916 B1 | | 7/2003 | Aroyan |
| 2003/0230438 A1 | | 12/2003 | Keefer et al. |
| 2003/0231169 A1 | * | 12/2003 | Aroyan et al. ............. 345/173 |

FOREIGN PATENT DOCUMENTS

EP    1-172-831 A2    1/2002

OTHER PUBLICATIONS

U.S. Appl. No. 10/748,573, filed Dec. 30, 2003 entitled "Touch Sensor with Linearized Response".

* cited by examiner

*Primary Examiner*—Nitin Patel
(74) *Attorney, Agent, or Firm*—Robert J. Pechman

(57) ABSTRACT

A pattern for linearizing an electric field and a touch sensor incorporating same are disclosed. The touch sensor includes an electrically resistive film that covers a touch sensitive area. The touch sensor further includes two or more substantially parallel polygonal rows of electrically conductive segments disposed on the resistive film and surrounding the touch sensitive area. Each edge of each row has one or more middle electrically conductive segments disposed between two end electrically conductive segments. Gaps separate adjacent conductive segments in a row. A middle conductive segment in a row fully overlaps a middle conductive segment in an adjacent row. The overlap defines a full overlap region. The touch sensor further includes a discrete electrically insulative segment disposed in the resistive film in the full overlap region. The insulative segment increases the electrical resistance between the two middle conductive segments.

23 Claims, 2 Drawing Sheets

TOUCH SENSOR WITH LINEARIZED RESPONSE

FIELD OF THE INVENTION

This invention generally relates to linearizing an electric field in an electrically resistive film. The invention is particularly applicable to linearizing an electric field in a touch sensitive area of a touch sensor by forming an electrode pattern around a perimeter of the touch sensitive area.

BACKGROUND

Touch screens allow a user to conveniently interface with an electronic display system. For example, a user can carry out a complicated sequence of instructions by simply touching the screen at a location identified by a pre-programmed icon. The on-screen menu may be changed by re-programming the supporting software according to the application.

Resistive and capacitive are two common touch sensing methods employed to detect the location of a touch input. A touch location is generally determined by applying an electric field to a resistive film in the touch sensitive area. For an electrically continuous resistive film, the accuracy of detecting the location of an applied touch typically depends on the linearity of the electric field in the resistive film. The electric field linearity is typically improved by forming an electrode pattern around the touch sensitive area.

SUMMARY OF THE INVENTION

Generally, the present invention relates to linearizing an electric field in an electrically resistive film. The present invention also relates to linearizing an electric field in a touch sensitive area of a touch sensor.

In one aspect of the invention, a touch sensor includes an electrically resistive film that covers a touch sensitive area. The touch sensor further includes two or more substantially parallel polygonal rows of electrically conductive segments disposed on the resistive film and surrounding the touch sensitive area. Each edge of each row have one or more middle electrically conductive segments disposed between two end electrically conductive segments. Gaps separate adjacent conductive segments in a row. A middle conductive segment in a row fully overlaps a middle conductive segment in an adjacent row. The overlapping portions of the two middle conductive segments define a full overlap region. The touch sensor further includes a discrete electrically insulative segment disposed in the resistive film in the full overlap region for increasing electrical resistance between the two middle conductive segments.

In another aspect of the invention, a touch sensor includes an electrically resistive film that covers a touch sensitive area. The touch sensor further includes two or more substantially parallel polygonal rows of discrete electrically conductive segments disposed on the resistive film and surrounding the touch sensitive area. Each edge of each row has one or more middle electrically conductive segments disposed between two end electrically conductive segments. A middle conductive segment in a row fully overlaps a middle conductive segment in an adjacent row. The touch sensor further includes a discrete electrically insulative segment disposed between one of the middle conductive segment and the resistive film to increase electrical resistance between the two middle conductive segments.

In another aspect of the invention, a touch sensor includes an electrically resistive film. The touch sensor further includes two substantially parallel rows of discrete conductive segments disposed on the resistive film. Gaps separate adjacent discrete conductive segments in each row. A conductive segment in one row fully overlaps a conductive segment in the other row. The overlap region between the two conductive segments defines a full overlap region. A gap in one row overlaps a conductive segment in the other row. The overlap region between the gap and the conductive segment defines a no overlap region. Each of the full and no overlap regions includes at least one discrete electrically insulative segment.

In another aspect of the invention, a touch sensor includes an electrically resistive film that covers a touch sensitive area. The touch sensor further includes a linearization pattern disposed on the resistive film and peripheral to the touch sensitive area for linearizing an electric field in the touch sensitive area. The linearization pattern includes multiple sides and is configured to conduct a parallel electrical current and a perpendicular electrical current at a local region within a side of the linearization pattern. The parallel current flows in a direction parallel to the side of the linearization pattern at the local region. The perpendicular current flows in a direction perpendicular to the side of the linearization pattern at the local region. The touch sensor further includes at least one discrete electrically insulative segment disposed within the local region. The insulative segment substantially affects the perpendicular current for controlling a voltage distribution along the side of the linearization pattern without substantially affecting the parallel current.

In another aspect of the invention, a touch sensor includes an electrically resistive film that covers a touch sensitive area. The touch sensor further includes a polygonal linearization pattern disposed on the resistive film and peripheral to the touch sensitive area for linearizing an electric field in the touch sensitive area. The linearization pattern has multiple sides, and is configured to provide a parallel voltage gradient and a perpendicular voltage gradient in a local region within a side of the linearization pattern. The parallel voltage gradient is in a direction parallel to the side of the linearization pattern at the local region. The perpendicular voltage gradient is in a direction perpendicular to the side of the linearization pattern at the local region. The touch sensor further includes at least one discrete electrically insulative segment disposed within the local region. The insulative segment substantially affects the perpendicular voltage gradient for controlling a voltage distribution along the side of the linearization pattern without substantially affecting the parallel voltage.

In another aspect of the invention, a touch sensor includes an electrically resistive film that covers a touch sensitive area. The touch sensor further includes two or more substantially parallel polygonal rows of electrically conductive segments disposed on the resistive film and surrounding the touch sensitive area. Each edge of each row has one or more middle electrically conductive segments disposed between two end electrically conductive segments. Gaps separate adjacent conductive segments in a row. A middle conductive segment in a row fully overlaps a middle conductive segment in an adjacent row. The overlapping portions of the two middle conductive segments define a full overlap region. A gap in a row overlaps a conductive segment in an adjacent row. The overlap region between the gap and the conductive segment defines a no overlap region. The touch sensor further includes means for increasing the electrical resistance of at least one of the overlap regions. The electrical resistance in the full overlap region is measured between the two middle conductive segments. The electrical resistance in the no overlap region is measured between the gap and the conductive segment.

BRIEF DESCRIPTION OF DRAWINGS

The invention may be more completely understood and appreciated in consideration of the following detailed description of various embodiments of the invention in connection with the accompanying drawings, in which.

Figures 1, 4:
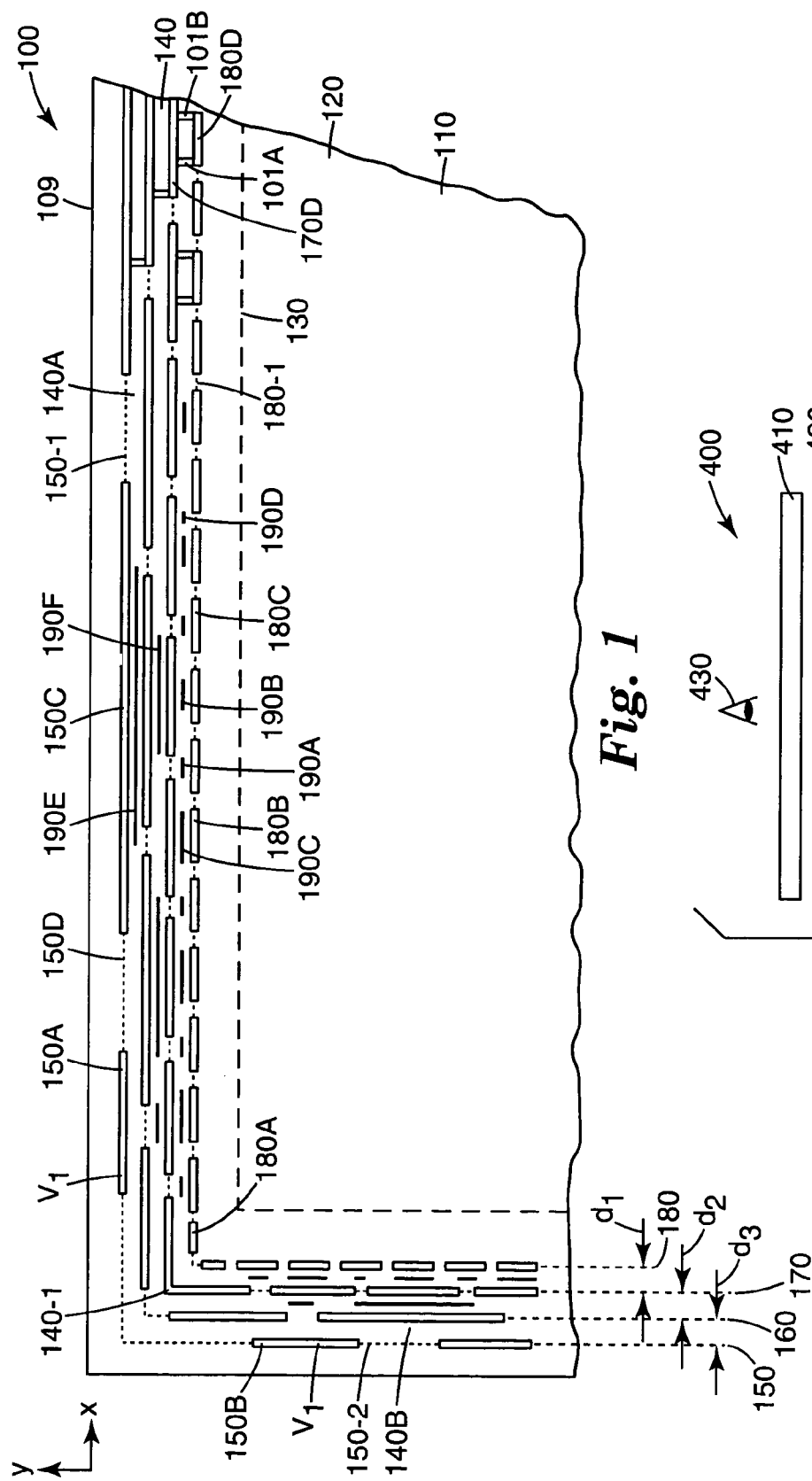
FIG. 1 illustrates a schematic top-view of a portion of a touch sensor in accordance with one embodiment of the invention.
FIG. 4 illustrates a schematic side-view of an optical system in accordance with another embodiment of the invention.

Unless otherwise indicated all figures and drawings in this document are schematic, dimensions are not to scale, and are chosen for the purpose of illustrating different embodiments of the invention. Furthermore, in describing the different embodiments of the invention, position of elements is sometimes described in terms of "top", "bottom", "left", and "right." These terms are used merely to simplify the illustration of different elements of the invention, such as those illustrated in drawings. They should not be understood to place any limitations on the useful orientation of the elements of the present invention.

DETAILED DESCRIPTION

The present invention generally relates to linearizing an electric field in an electrically resistive film by forming an electrode pattern on the resistive film. The invention is particularly applicable to touch sensors employing an electrode pattern for linearizing the electric field in a touch sensitive area to more accurately determine the location of an applied touch.

A touch screen functions on the general principle that an otherwise open electrical circuit is closed when a touch is applied. The properties of a signal generated in the closed circuit allows detection of a touch location. Various technologies may be employed to detect a touch location. One such technology is resistive. In a resistive touch, an applied touch brings two otherwise physically separated resistive films into direct physical contact with one another. The physical contact closes an otherwise open electronic circuit, thereby resulting in generation of a resistively coupled electrical signal. The properties of the generated signal allow detection of the touch location.

Capacitive is another technology commonly used to detect location of a touch. In this case, a signal is generated when a conductive touch implement, such as a user's finger or a conductive stylus, is brought sufficiently close to an electrically resistive film to allow capacitive coupling between the two. Properties of the generated signal allow detection of the touch location.

The present invention is particularly applicable to touch screens utilizing resistive or capacitive technologies where an electric field is linearized in one or more directions in a plane of an electrically resistive film in a touch sensitive area. U.S. Pat. Nos. 4,198,539; 4,293,734; 4,371,746; 4,822,957; 5,045,644; 6,163,313; and 6,593,916 disclose linearizing electrode patterns disposed on a perimeter of a touch sensitive area. Commonly owned U.S. patent application Ser. Nos. 09/169,391 and 10/748,573 disclose electrode patterns for improving field linearity of a touch panel. In particular, electrode patterns disclosed in U.S. Ser. No. 09/169,391 include rows of conductive segments disposed on the border of a resistive layer where every row has at least two conductive segments, each of which faces at least a portion of three conductive segments in an adjacent row.

The present invention describes a linearization pattern for improving linearity of an electric field, for example, in a touch sensitive area of a touch sensor. In particular, according to one aspect of the invention, the electric field is linearized across the entire area surrounded by the linearization pattern. In such a case, one or more inner edges of the linearization pattern can form an equipotential. As such, in a touch sensor according to one aspect of the invention, the touch sensitive area of the touch sensor can extend the entire area enclosed by the linearization pattern.

The linearization pattern can be a polygon, having a plurality of sides, where each two adjacent sides intersect at a polygon vertex. The linearization pattern can be disposed around the touch sensitive area of the touch sensor.

The polygonal linearization pattern can include multiple rows of discrete conductive segments, where each row can have the same polygonal shape, and where corresponding edges of the rows can be substantially parallel to each other. The rows of the polygonal linearization pattern can be concentric. Each row of the linearization pattern can include a plurality of discrete conductive segments, conductive segments in a row being separated by gaps. Each row of the linearization pattern has a plurality of edges, where each two adjacent edges of the row intersect at a row vertex.

A discrete conductive segment can fully overlap a discrete conductive segment in an adjacent row defining a "full overlap" region between the two overlapping conductive segments. Accordingly, a full overlap region is bounded on one side by an entire discrete conductive segment in a row, and on the opposite side by at least a portion of a discrete conductive segment in an adjacent row.

A discrete conductive segment in the linearization pattern can partially overlap a discrete conductive segment in an adjacent row, the overlap region defining a "partial overlap" region between the two overlapping conductive segments. A partial overlap region is bounded on one side by a portion of a discrete conductive segment in one row, and on the opposite side by a portion of a discrete conductive segment in an adjacent row.

The linearization pattern can further have "no overlap" regions, where a no overlap region is a region defined by an overlap region between a gap in one row and at least a portion of a discrete conductive segment in an adjacent row. A "no overlap" region can also exist when a gap in one row overlaps a gap in an adjacent row.

According to one aspect of the invention, linearity of the electric field in the touch sensitive area can be improved by disposing insulating segments in full overlap or no overlap regions of the linearization pattern. By appropriately placing insulating segments in such areas, linear equipotential lines can be realized that extend across most or even the entire region enclosed within the linearization pattern while substantially maintaining a linear signal gradient across the touch sensitive area.

FIG. 1 illustrates a schematic top view of a portion of a touch sensor 100 in accordance with a preferred embodiment of the invention. FIG. 1 is drawn for the purpose of discussing the indicated elements, and therefore, is not necessarily perfectly scaled. Touch sensor 100 includes a resistive film 110 that covers a touch sensitive area 120. Touch sensitive area 120 is defined by a perimeter 130. Touch sensor 100 further includes a linearization pattern 140 disposed on resistive film 110 and surrounding touch sensitive area 120. As such, touch sensitive area 120 is enclosed within linearization pattern 140. Linearization pattern 140 can have a polygonal shape, where the polygon has a plurality of sides with adjacent sides intersecting at a polygon vertex and forming a corner. For example, linearization pattern 140 has a side 140A oriented along the x-axis and a side 140B oriented along the y-axis. Sides 140A and 140B form a corner by intersecting at a polygon vertex 140-1. The sides of the linearization pattern may be straight or curved. For example, sides of linearization pattern 140 may bow inward or outward in an arc along each side. Furthermore, the corners of the linearization pattern can be rounded off.

Linearization pattern 140 includes multiple substantially parallel rows of discrete conductive segments that are in electrical contact with resistive film 110. In particular, FIG. 1 shows a first row of discrete conductive segments 150, a second row of discrete conductive segments 160, a third row of discrete conductive segments 170, and a fourth row of discrete conductive segments 180. First row 150 is also the outermost row of linearization pattern 140. Each of rows 160, 170 and 180 is an inner row of linearization pattern 140. Furthermore, row 180 is the innermost row of linearization pattern 140. Each row of linearization pattern 140 includes multiple edges, with every two adjacent edges in a row intersecting at a vertex. For example, adjacent edges 150-1 and 150-2 of row 150 intersect at vertex 140-1. For convention, for any two given rows, the row that is closer to perimeter 109 of resistive film 110 is referred to as an outer row, and the row that is farther from perimeter 109 is referred to as an inner row. The outermost and innermost rows refer to the rows closest to and farthest from perimeter 109, respectively.

The polygon may be any polygonal shape, generally a square, a rectangle, or a triangle.

Each edge of each row of linearization pattern 140 includes one or more middle conductive segments disposed between two end conductive segments. For example, conductive segment 150C is a middle conductive segment in edge 150-1 of outermost row 150, conductive segment 150A is an end conductive segment in edge 150-1 of row 150, and conductive segment 150B is an end conductive segment in edge 150-2 of row 150. End conductive segments 150A and 150B are both near vertex 140-1. As another example, conductive segments 180B and 180C are two middle segments in edge 180-1 of row 180, and conductive segment 180A is an end conductive segment in the same edge near vertex 140-1.

Furthermore, conductive segments in a row are separated by gaps. For example, gap 150D in row 150 separates adjacent conductive segments 150A and 150C in the same row.

Figure 2:
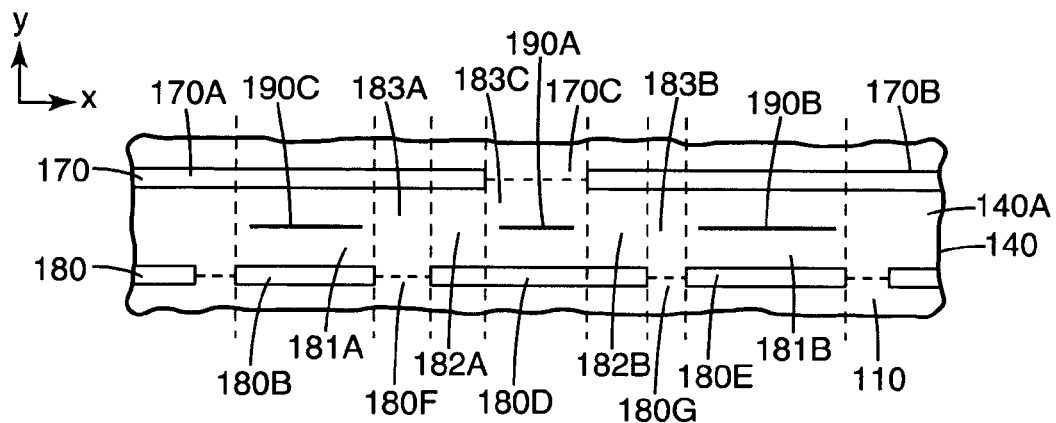
FIG. 2 illustrates a magnified portion of the touch sensor shown in FIG. 1.

Touch sensor 100 further includes full overlap, partial overlap, and no overlap regions. For ease of illustration, these regions are described in reference to FIG. 2 which shows a magnified exemplary portion of touch sensor 100. FIG. 2 shows a portion of adjacent rows 170 and 180. In particular, FIG. 2 shows middle conductive segments 170A and 170B in row 170 separated by gap 170C. FIG. 2 also shows middle conductive segments 180B, 180D, and 180E in row 180 separated by gaps 180F and 180G, respectively.

Conductive segment 180B fully overlaps conductive segment 170A, the overlapping region defining a full overlap region 181A. Similarly, a full overlap region 181B is defined by the overlapping region between segments 180E and 170B.

Conductive segment 180D partially overlaps conductive segments 170A and 170B, the overlapping regions defining partial overlap regions 182A and 182B, respectively.

Furthermore, gap 180F fully overlaps conductive segment 170A, the overlapping region defining a no overlap region 183A. Similarly, gap 180G fully overlaps conductive segment 170B, the overlapping region defining a no overlap region 183B. Furthermore, gap 170C fully overlaps conductive segment 180D, the overlapping region defining a no overlap region 183C.

According to one aspect of the invention, full overlap regions 181A and 181B include insulative segments 190C and 190B, respectively, disposed in the resistive film 110 to increase electrical resistance between the corresponding fully overlapping conductive segments. In particular, insulative segment 190C increases the electrical resistance between fully overlapping middle segments 170A and 180B, and insulative segment 190B increases the electrical resistance between fully overlapping middle segments 170B and 180E.

Furthermore, according to one aspect of the invention, a no overlap region in touch sensor 100 includes an insulative segment disposed in resistive film 110. For example, FIG. 2 shows an insulative segment 190A disposed in resistive film 110 in no overlap region 183C. Insulative segment 190A may be disposed anywhere in the no overlap region. For example, insulative segment 190A may be disposed somewhere in the interior of the no overlap region as shown in FIG. 2. As another example, insulative segment 190A may be disposed along an edge of the perimeter defining the no overlap region. For example, insulative segment 190A may be disposed in gap region 170C between conductive segments 170A and 170B. In FIG. 2, each insulative segment is confined in its corresponding overlap region. For example, insulative segment 190A is shown to be confined within no overlap region 183C. In general, an insulative segment may extend outside its corresponding region. For example, insulative segment 190A may extend beyond region 183C, for example, into neighboring regions 182A or 182B or both. As another example, referring back to FIG. 1, electrically insulative segment 190E extends outside a full overlap region and partially into the neighboring no overlap regions. As yet another example, electrically insulative segment 190D extends outside a no overlap region and into a neighboring partial overlap region.

According to one aspect of the invention, an electrically insulative segment closer to outermost row 150 is longer than an electrically insulative segment farther from the outermost row. For example, insulative segment 190E is longer than insulative segment 190F which is longer than insulative segment 190B.

According to one aspect of the invention, an insulative segment, such as insulative segment 190F, may be a void in resistive film 110, meaning that the insulative segment may be formed by omitting at least a portion of the material forming resistive film 110. The material forming resistive film 110 may be omitted by, for example, laser ablation, chemical or mechanical etching, or by masking the area corresponding to an insulative segment during the application of the material that forms resistive film 110. A purpose of an insulative segment is to increase electrical resistance between the overlapping segments (or gaps) that form the region containing the insulative segment. For example, referring to FIG. 2, insulative segment 190B increases the electrical resistance between fully overlapping middle conductive segments 180E and 170B. The electrical resistance between the two conductive segments can also be increased by increasing the electrical resistance between at least a portion of one of the conductive segments, for example, a portion of conductive segment 170B that fully overlaps conductive segment 180E, and resistive film 110. This can be achieved by, for example, disposing a discrete electrically insulative segment between a portion of conductive segment 170B and resistive film 110.

Figure 3:
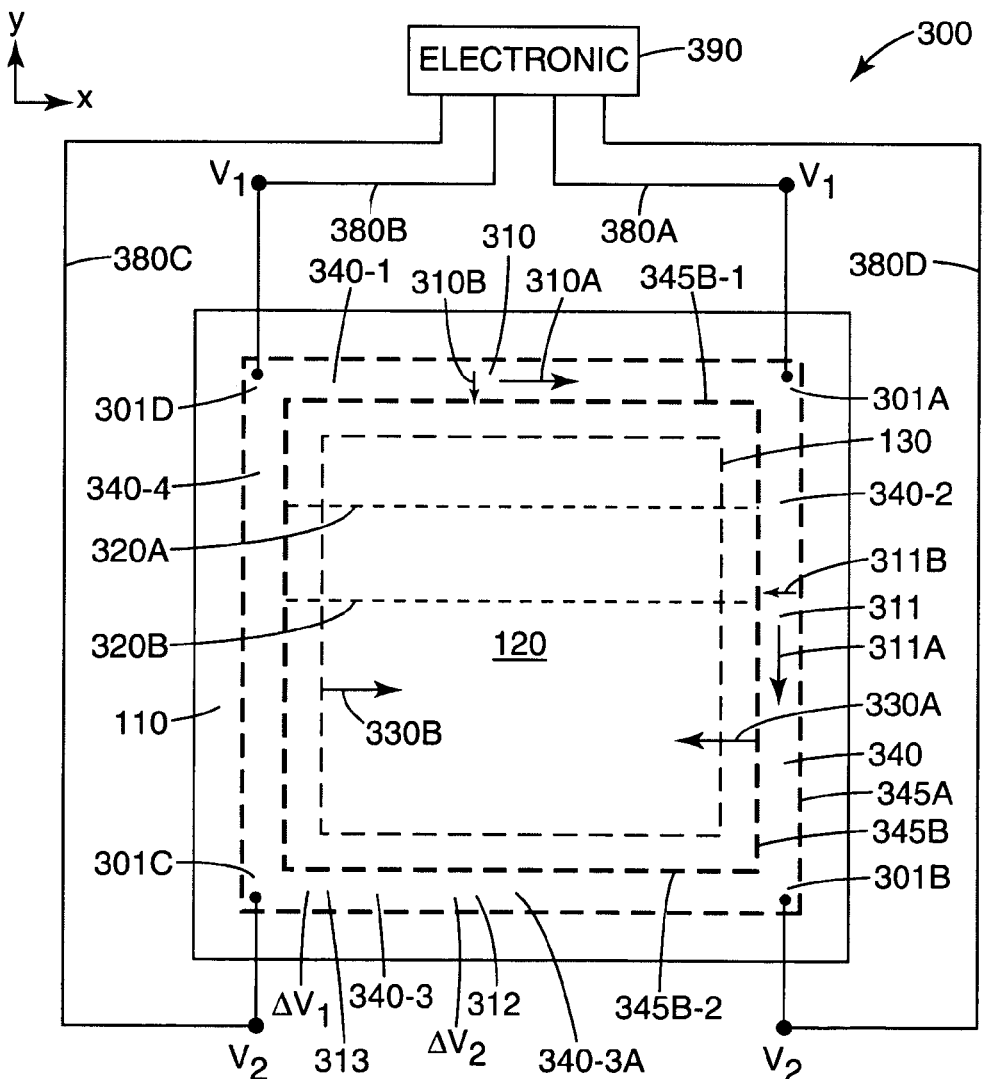
FIG. 3 illustrates a schematic top-view of a touch sensor.

Some aspects of the present invention are further described in reference to FIG. 3 which illustrates a schematic top view of a touch sensor 300. In the specification, a same reference numeral used in multiple figures refers to same or similar elements having same or similar properties and functionalities. Touch sensor 300 includes a linearization pattern 340 disposed on electrically resistive film 110. Linearization pattern 340 is confined between an outer perimeter 345A and an inner perimeter 345B. Linearization pattern 340 can, for example, be the linearization pattern described in reference to FIG. 1. FIG. 3 shows a rectangular linearization pattern, although, in general, linearization pattern 340 can have any polygonal shape. Linearization pattern 340 has sides 340-1, 340-2, 340-3 and 340-4. Each side of the linearization pattern defines a direction along or parallel to the side, and a direction perpendicular to the side. For example, side 340-1 defines a direction parallel to side 340-1 which is along the x-axis, and a direction perpendicular to side 340-1 which is along the y-axis. Similarly, side 340-2 defines a direction parallel to side 340-2 which is along the y-axis, and a direction perpendicular to side 340-2 which is along the x-axis.

For ease of illustration and without any loss of generality, different aspects of this invention are described for a resistive touch sensor 300 realizing that a linearization pattern according to any embodiment of the present invention may be used in any touch technology that can benefit from a linearization electrode pattern to linearize an electric field in a touch sensitive area. Touch sensitive area 120 of touch sensor 300 may be activated by applying a differential signal across the touch sensitive area. Such signal can be applied, for example, by applying a voltage $V_1$ to top corners 301A and 301D of the touch sensor, and a different voltage $V_2$ to bottom corners 301B and 301C of the touch sensor, resulting in a differential voltage, $\Delta V$, of $V_{1-V2}$ being applied across the touch sensor. As an example, and without loss of generality, $V_2$ is assumed to be less than $V_1$. $V_2$ is often a ground potential, typically zero volts, although $V_2$ can be a different potential. $V_1$ can be any AC or DC voltage suitably available for use in a touch sensor, generally 10 volts or less, although other voltages can be used. For AC field activating signals, the static situation shown in FIG. 3 may be considered as a snapshot in time for purposes of illustration.

The differential voltage $\Delta V$, applied across touch sensor 300, can result in a flow of an electrical current through touch sensitive area 120. The applied differential voltage can also result in a voltage gradient across touch sensitive area 120 where the gradient direction for the particular example described in FIG. 3 is in the "y" direction. The differential voltage preferably results in a linear field in touch sensitive area 120, meaning that equipotential lines are straight and are preferably oriented along the x-axis.

A desirable function performed by linearization pattern 340 is to provide a linear resistance along sides 340-2 and 340-4 of linearization pattern 340 that result in a linear voltage gradient along each of the two sides. Under such conditions, differential voltage $\Delta V$ is evenly divided between corners 301A and 301B, and between corners 301D and 301C. Furthermore, the voltage gradients along sides 340-2 and 340-4 of linearization pattern 340 preferably match the voltage gradient in touch sensitive area 120. In such a case, equipotential lines, such as equipotential lines 320A and 320B, are straight both inside and outside touch sensitive area 120 as shown in FIG. 3 (by definition, all points on an equipotential line, such as line 320A, have the same potential, for example, in this case some voltage in the range from $V_1$ to $V_2$). As such, currents flowing from sides 340-2 and 340-4 into touch sensitive area 120, such as currents 330A and 330B, are eliminated or substantially reduced, thus improving field linearity in the touch sensitive area. According to one aspect of the invention, any current flowing within sides 340-2 or 340-4 of linearization pattern 340 is confined within the side, that is, any such current is confined between inner perimeter 345B and outer perimeter 345A.

Improved field linearity can allow expansion of touch sensitive area 120. For example, where equipotential lines are straight across the entire region enclosed within inner perimeter 345B (as illustrated in FIG. 3 by equipotential lines 320A and 320B), touch sensitive perimeter 130 may be expanded to increase the area covered by touch sensitive area 120. As such, the entire area within perimeter 345B may be linearized and sensitive to touch. Such an expansion of touch sensitive area can also result in a reduction of touch sensor border.

Another desirable function of linearization pattern 340 is to provide uniform current to touch sensitive area 120 flowing from side 340-1 to side 340-3, where by uniform current it is meant that a current flowing from side 340-1 into touch sensitive area 120 has a uniform current density along the length of side 340-1, or equivalently, along the x-axis. Under such a case, the inner edge of linearization pattern 340 along side 340-1, or equivalently, edge 345B-1 of inner perimeter 345B, forms an equipotential. As such, all currents flowing from side 340-1 into touch sensitive area 120 flow in a direction normal to edge 345B-1, side 340-1, or x-axis. Similarly, edge 345B-2 of bottom side 340-3 forms an equipotential. Top-side 340-1 and bottom-side 340-3 may be viewed as current source and sink, respectively, for current flowing through touch sensitive area 120.

An electric current flowing in a local region within a side of linearization pattern 340 has a component flowing substantially parallel to the side at the location of the local region, and a component flowing substantially perpendicular to the side at the same location. For example, a current flowing in a local region 310 within side 340-1 of linearization pattern 340 has a parallel current component 310A flowing substantially parallel to side 340-1 (i.e., along x-axis), and a perpendicular current component 310B flowing substantially perpendicular to side 340-1 (i.e., along y-axis). As another example, a current flowing in a local region 311 within side 340-2 of linearization pattern 340 has a parallel current component 311A flowing substantially parallel to side 340-2 (i.e., along y-axis), and a perpendicular current component 311B flowing substantially perpendicular to side 340-2 (i.e., along x-axis). According to one aspect of the invention, a discrete electrically insulative segment disposed in a local region within a side of linearization pattern, substantially affects a perpendicular current flowing in the local region perpendicular to the side without substantially affecting a parallel current flowing in the local region parallel to the side. For example, referring to FIG. 2, insulative segment 190B in side 140A of linearization pattern 140 can substantially affect a perpendicular current flowing in local region 181B along the y-axis without substantially affecting a parallel current flowing in the same local region along the x-axis.

Referring back to FIG. 3, an electric current flowing in a local region within linearization pattern 340 flows along a voltage gradient. For example, perpendicular current 311B corresponds to and flows along a perpendicular voltage gradient, where the perpendicular voltage gradient is in local region 311 and is oriented in the same direction as current 311B (i.e., x-axis) in local region 311. Similarly, parallel current 311A corresponds to and flows along a parallel voltage gradient, where the parallel voltage gradient is in local region 311 and is oriented in the same direction as current 311A (i.e., y-axis). Similarly, perpendicular current 310B corresponds to a perpendicular voltage gradient that is oriented in the same direction as current 310B, and parallel current 310A corresponds to a parallel voltage gradient that is oriented in the same direction as current 310A. As such, according to one aspect of the invention, linearization pattern 340 provides parallel and perpendicular voltage gradients in a local region within a side of the linearization pattern, where the parallel voltage gradient is a voltage gradient in a direction parallel to the side of the linearization pattern at the local region, and the perpendicular voltage gradient is a voltage gradient in a direction perpendicular to the side of the linearization pattern at the local region. Furthermore, a discrete insulative segment disposed in the local region substantially affects the perpendicular voltage gradient in the local region without substantially affecting the parallel voltage gradient in the same local region.

According to one embodiment of the invention, one or more segments in a given row are electrically connected to one or more segments in an adjacent row via one or more electrically conductive bars. For example, referring to FIG. 1, conductive segment 180D in row 180 is connected to conductive segment 170D in adjacent row 170 via conductive bars 101A and 101B. Conductive bars 101A and 101B are preferably made of the same material as the conductive segments. Conductive bars preferably have substantially the same sheet resistance as the conductive segments, although, in some embodiments of the present invention, some or all conductive bars can be made of a material and/or have sheet resistance that is different than those of some or all of the conductive segments.

Furthermore, according to one embodiment of the invention, a discrete electrically insulative segment may be connected to another discrete electrically insulative segment via one or more electrically insulative bars (not shown in FIG. 1) where the insulative bars may be disposed in resistive film 110.

Each side of linearization pattern can have a midpoint and terminate in two ends. For example, referring to FIG. 3, side 340-3 of linearization pattern 340 has a midpoint 340-3A and two end points 301B and 301C which are also two corners of linearization pattern 340. Midpoint 340-3A is the midway point between end points 301B and 301C.

According to one embodiment of the invention, a perpendicular voltage gradient in a local region within a side of linearization pattern 340 is greater for the local region being farther from the midpoint of the side than for the local region being closer to the midpoint of the side. For example, a perpendicular voltage gradient in local region 313 can be greater than a perpendicular voltage gradient in local region 312.

Furthermore, according to another embodiment of the invention, a perpendicular voltage gradient in a local region within a side of linearization pattern 340 is more affected by one or more insulative segments disposed in the local region for the local region being farther from the midpoint of the side than for the local region being closer to the midpoint of the side. For example, a perpendicular voltage gradient within local region 313 can be $\Delta V_1$ and a perpendicular voltage gradient within local region 312 can be $\Delta V_2$ where local region 312 is closer to midpoint 340-3A and local region 313 is farther from midpoint 340-3A. According to one embodiment of the invention, an effect of one or more insulative segments disposed within local region 313 on perpendicular voltage gradient $\Delta V_1$ is greater than an effect that one or more insulative segments disposed within local region 312 can have on perpendicular voltage gradient $\Delta V_2$.

According to one embodiment of the invention, the number of conductive segments in a given row may be odd or even. Furthermore, the number of conductive segments in a given edge of a given row may be odd or even. Furthermore, the separation between a pair of adjacent rows need not be equal to the separation between another pair of adjacent rows. For example, referring to FIG. 1, $d_1$, the separation between rows 180 and 170; $d_2$, the separation between rows 170 and 160; and $d_3$, separation between rows 160 and 150, need not be equal, although in some embodiments of the invention, $d_1$, $d_2$ and $d_3$ may be substantially equal.

Referring back to FIG. 3, touch sensor 300 further includes electronics 390 electrically connected to linearization pattern 340, resistive film 110, and touch sensitive area 120 via electrically conductive leads, such as exemplary leads 380A, 380B, 380C, and 380D, where leads 380A and 380B are connected to side 340-1 and leads 380C and 380D are connected to opposite side 340-3. Electronics 390 detect the location of an input touch applied to touch sensitive area 120 by activating touch sensitive area 120, for example, by applying one or more signals to one or more conductive segments in linearization pattern 340, such as voltage $V_1$ being applied to conductive segments 150A and 150B in FIG. 1).

Resistive film 110 can be made of a semiconductor, doped semiconductor, semi-metal, metal oxide, an organic conductor, a conductive polymer, or the like. Exemplary inorganic materials include conductive oxides, for example indium tin oxide (ITO), tin antimony oxide (TAO), and the like. Exemplary organic materials include carbon filled inks, and conductive polymers such as polypyrrole, polyaniline, polyacetylene, and polythiophene, such as those disclosed in European Patent Publication EP-1-172-831-A2.

The conductive segments can include a metal such as silver, gold, copper, aluminum, lead, and the like, or a combination of metals. The conductive segments can include carbon or other additives to make the segments conductive or more conductive. The conductive segments can be deposited onto the resistive film using ink jet printing, screen printing, or any other suitable method for depositing the conductive segments onto the resistive film. The conductive segments can be patterned using photolithography, ink jet printing, or any other suitable patterning method.

According to one embodiment of the invention, different conductive segments can have different sheet resistance or overall electrical conductivity. For example, the conductive segments in an outer row can be more conductive than the conductive segments in an inner row. As another example, for a given edge in a given row, the end segments can be more conductive than the middle segments. In general, a conductive segment can be made more conductive by increasing its width, thickness, or by using a more conductive material to make the segment.

For the purposes of this invention, field linearity is defined in terms of the departure of the field from a linear electric field. Field linearity can further be defined in terms of linearity and spacing uniformity of equipotential lines, especially near the linearization pattern. The electric field in touch sensitive area 120 is preferably linearized to within 1%, more preferably to within 0.5%, and even more preferably to within 0.25%.

A numerical simulation of touch sensor 100 in FIG. 1 resulted in a field linearity of better than 0.75% in touch sensitive area 120 where perimeter 130 of the touch sensitive area was expanded to include the innermost row of linearization pattern 140. The field linearity was further improved to better than 0.3% when touch sensitive area 120 made up 99% of the area surrounded by linearization pattern 140. In contrast, a numerical analysis of a similar touch sensor, but without any insulative segments, resulted in a field linearity of about 2% when touch sensitive area 120 included the innermost row of linearization pattern 140, and about 1% when the touch sensitive area made up 99% of the area surrounded by linearization pattern 140.

According to one embodiment of the invention, touch sensitive area 120 can be activated by applying signals, such as voltages, to different conductive segments of linearization pattern 340. For example, for a rectangular electrode pattern, a touch sensitive area can be activated by applying a signal, such as a voltage $V_1$, to two end conductive segments along one side of linearization pattern 340, and a different signal, such as a voltage $V_2$, to two end conductive segments along an opposing side of linearization pattern 340. As another example, for a triangular linearization pattern, touch sensitive area 120 can be activated by applying a first signal, such as a voltage $V_a$, to one or more conductive segments along a first side of the triangular linearization pattern, a second signal, such as a voltage $V_b$, to one or more conductive segments along a second side of the triangular linearization pattern, and a third signal, such as a voltage $V_c$, to one or more conductive segments along a third side of the triangular linearization pattern, where the three signals, such as voltages $V_a$, $V_b$, and $V_c$, can be different in magnitude or phase, although in some cases, such as a capacitive touch sensor, voltages $V_a$, $V_b$, and $V_c$ can have the same magnitude and phase.

FIG. 4 illustrates a schematic side-view of an optical system 400 in accordance with one particular embodiment of the invention. Optical system 400 includes a touch sensor 410 according to any embodiment of the invention, and a display 420 for displaying information to a viewing position 430. In particular, touch sensor 410 incorporates a linearization pattern (not shown in FIG. 4) according to any embodiment of the invention for linearizing the field. Touch sensor 410 may be a resistive touch sensor, a capacitive touch sensor, or it may employ any other touch sensing technology that can benefit from incorporating a linearization pattern according to any embodiment of the invention to improve field linearity. Examples of display 420 include a liquid crystal display, a cathode ray tube (CRT) display, a light emitting diode display, a plasma display, an organic light emitting display, a field emission display, an electroluminescent display, static printed display, and other suitable image forming displays. Display 420 can be graphics, text, or other indicia displaying information to the viewing position 430.

All patents, patent applications, and other publications cited above are incorporated by reference into this document as if reproduced in full. While specific examples of the invention are described in detail below to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A touch sensor comprising:
    an electrically resistive film covering a touch sensitive area;
    two or more substantially parallel polygonal rows of electrically conductive segments separated by gaps disposed on the resistive film and surrounding the touch sensitive area, each edge of each row having one or more middle electrically conductive segments disposed between two end electrically conductive segments, a first middle conductive segment in one of the rows fully overlapping a second middle conductive segment in an adjacent row, the overlapping portions of the first and second middle conductive segments defining a full overlap region; and
    a first discrete electrically insulative segment disposed in the resistive film in the full overlap region to increase electrical resistance between the first and second middle conductive segments.

2. The touch sensor of claim 1, wherein an electric field in the touch sensitive area is linearized to within 0.5%.

3. The touch sensor of claim 1 further comprising electronics configured to detect a location of an input touch applied to the touch sensitive area.

4. The touch sensor of claim 1 further comprising one or more additional discrete electrically insulative segments disposed in the resistive film in the full overlap region.

5. The touch sensor of claim 1, wherein the electrically insulative segment is confined to the full overlap region.

6. The touch sensor of claim 1, wherein the electrically insulative segment extends outside the full overlap region.

7. The touch sensor of claim 1, wherein an electrically insulative segment closer to an outermost row is longer than an electrically insulative segment farther from the outermost row.

8. The touch sensor of claim 1 further comprising:
    a third conductive segment in one of the rows partially overlapping a fourth conductive segment in an adjacent row, the overlapping portions of the third and fourth conductive segments defining a partial overlap region; and
    a second discrete electrically insulative segment disposed in the resistive film in the partial overlap region.

9. The touch sensor of claim 1 further comprising:
    a first gap in one of the rows overlapping a fifth conductive segment in an adjacent row, the overlapping portions of the first gap and the fifth conductive segment defining a no overlap region; and
    a third discrete electrically insulative segment disposed in the resistive film in the no overlap region.

10. An optical system for displaying information to a viewing position including the touch sensor of claim 1.

11. The touch sensor of claim 10 further comprising electronics configured to detect a location of an input touch applied to the touch sensitive area.

12. The touch sensor of claim 10, wherein a portion of the electrically insulative segment is not covered by the first middle conductive segment.

13. A touch sensor comprising:
    an electrically resistive film covering a touch sensitive area;

two or more substantially parallel polygonal rows of discrete electrically conductive segments disposed on the resistive film and surrounding the touch sensitive area, each edge of each row having one or more middle electrically conductive segments disposed between two end electrically conductive segments, a first middle conductive segment in one of the rows fully overlapping a second middle conductive segment in an adjacent row; and a first discrete electrically insulative segment disposed between the first middle conductive segment and the resistive film to increase electrical resistance between the first and second middle conductive segments.

14. A touch sensor comprising:
an electrically resistive film; and
two substantially parallel rows of discrete conductive segments disposed on the resistive film; gaps separating adjacent discrete conductive segments in each row; a first conductive segment in one row fully overlapping a second conductive segment in the other row, the overlap region between the first and second conductive segments defining a full overlap region; a first gap in one row overlapping a third conductive segment in the other row, the overlap region between the first gap and the third conductive segment defining a no overlap region; each of the full and no overlap regions including at least one discrete electrically insulative segment.

15. The touch sensor of claim 14, wherein at least one of the at least one discrete electrically insulative segment is a void region in the resistive film.

16. The touch sensor of claim 14, wherein at least one of the at least one discrete electrically insulative segment is disposed between the resistive film and one of the first, second, and third conductive segments.

17. A touch sensor comprising:
an electrically resistive film covering a touch sensitive area;
a linearization pattern disposed on the resistive film peripheral to the touch sensitive area for linearizing an electric field in the touch sensitive area, the linearization pattern having multiple sides and configured to conduct a parallel electrical current and a perpendicular electrical current at a local region within a side of the linearization pattern, the parallel current flowing in a direction parallel to the side of the linearization pattern at the local region, the perpendicular current flowing in a direction perpendicular to the side of the linearization pattern at the local region; and
at least one discrete electrically insulative segment disposed within the local region, the insulative segment substantially affecting the perpendicular current for controlling a voltage distribution along the side of the linearization pattern without substantially affecting the parallel current.

18. The touch sensor of claim 17, wherein the linearization pattern includes two or more parallel rows of discrete electrically conductive segments, each row having one or more middle electrically conductive segments disposed between two end electrically conductive segments, a first middle conductive segment in a row fully overlapping a second middle conductive segment in an adjacent row, the local region being the over lap region between the first and second middle conductive segments.

19. A touch sensor comprising:
an electrically resistive film covering a touch sensitive area;
a polygonal linearization pattern disposed on the resistive film peripheral to the touch sensitive area for linearizing an electric field in the touch sensitive area, the linearization pattern having multiple sides, and configured to provide a parallel voltage gradient and a perpendicular voltage gradient in a local region within a side of the linearization pattern, the parallel voltage gradient being in a direction parallel to the side of the linearization pattern at the local region, the perpendicular voltage gradient being in a direction perpendicular to the side of the linearization pattern at the local region; and
at least one discrete electrically insulative segment disposed within the local region, the insulative segment substantially affecting the perpendicular voltage gradient for controlling a voltage distribution along the side of the linearization pattern without substantially affecting the parallel voltage.

20. The touch sensor of claim 19, wherein the perpendicular voltage gradient is affected more when the local region is farther from the midpoint of the side than when the local region is closer to the midpoint of the side.

21. The touch sensor of claim 19, wherein the perpendicular voltage gradient is greater when the local region is farther from the midpoint of the side than when the local region is closer to the midpoint of the side.

22. A touch sensor comprising:
an electrically resistive film covering a touch sensitive area;
two or more substantially parallel polygonal rows of electrically conductive segments separated by gaps disposed on the resistive film and surrounding the touch sensitive area, each edge of each row having one or more middle electrically conductive segments disposed between two end electrically conductive segments, a first middle conductive segment in a first row fully overlapping a second middle conductive segment in a second row adjacent to the first row, the overlapping portions of the first and second middle conductive segments defining a full overlap region; a first gap in a third row overlapping a third conductive segment in a fourth row adjacent to the third row, the overlap region between the first gap and the third conductive segment defining a no overlap region; and
means for increasing the electrical resistance of at least one of the full and no overlap regions, the electrical resistance in the full overlap region being measured between the first and second middle conductive segments, the electrical resistance in the no overlap region being measured between the first gap and the third conductive segment.

23. The touch sensor of claim 22, wherein the means includes one or more electrically insulative segments disposed in the electrically resistive film within at least one of the full and no overlap regions.

* * * * *

UNITED STATES PATENT AND TRADEMARK OFFICE
CERTIFICATE OF CORRECTION

| | |
|---|---|
| PATENT NO. | : 7,227,538 B2 |
| APPLICATION NO. | : 10/786205 |
| DATED | : June 5, 2007 |
| INVENTOR(S) | : Bernard O. Geaghan |

It is certified that error appears in the above-identified patent and that said Letters Patent is hereby corrected as shown below:

<u>Column 7</u>,
Line 45, delete "$V_{1-V2}$" and insert -- $V_1-V_2$ --, therefor.

<u>Column 13</u>,
Line 62, in Claim 18, delete "over lap" and insert -- overlap --, therefor.

Signed and Sealed this

Twentieth Day of November, 2007

JON W. DUDAS
*Director of the United States Patent and Trademark Office*